US012332737B2

United States Patent
Nautiyal et al.

(10) Patent No.: US 12,332,737 B2
(45) Date of Patent: Jun. 17, 2025

(54) METHOD AND APPARATUS FOR FAULT INDICATION PROPAGATION AND FAULT MASKING IN A HIERARCHICAL ARRANGEMENT OF SYSTEMS

(71) Applicant: NXP B.V., Eindhoven (NL)

(72) Inventors: Hemant Nautiyal, Greater Noida (IN); Shruti Singla, Samana (IN); Rohan Poudel, Bhairahawa (NP); Shreya Singh, Ranchi (IN); Sandeep Kumar Arya, Bangalore (IN); Bipin Gupta, Indergarh (IN)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 18/310,591

(22) Filed: May 2, 2023

(65) Prior Publication Data

US 2024/0303152 A1    Sep. 12, 2024

(30) Foreign Application Priority Data

Mar. 8, 2023    (IN) .............................. 202341015474

(51) Int. Cl.
  *G06F 11/00*    (2006.01)
  *G06F 11/07*    (2006.01)

(52) U.S. Cl.
  CPC ...... *G06F 11/0793* (2013.01); *G06F 11/0721* (2013.01)

(58) Field of Classification Search
  CPC .... G06F 11/0793; G06F 11/0721; G06F 1/24; G06F 9/4812; G06F 11/0772; G06F 13/24; G06F 11/1441
  See application file for complete search history.

(56) References Cited

U.S. PATENT DOCUMENTS

| | | | | |
|---|---|---|---|---|
| 5,537,655 A | * | 7/1996 | Truong | G06F 11/1679 307/409 |
| 5,915,082 A | * | 6/1999 | Marshall | G06F 11/10 714/E11.061 |
| 6,618,361 B1 | * | 9/2003 | Park | G06F 1/24 370/257 |
| 6,823,413 B2 | * | 11/2004 | Fujiki | G06F 13/24 710/48 |
| 7,328,371 B1 | * | 2/2008 | Kalyanasundharam | G06F 11/1641 712/34 |
| 9,218,893 B2 | * | 12/2015 | Kochar | G11C 29/56 |
| 9,495,239 B1 | * | 11/2016 | Ahmad | G06F 11/0772 |
| 9,672,085 B2 | | 6/2017 | Zhu et al. | |

(Continued)

FOREIGN PATENT DOCUMENTS

EP    3629176 A1    4/2020

*Primary Examiner* — Loan L. T. Truong (57) ABSTRACT

A central system coupled to a subsystem receives a fault indication associated with a fault in one or more circuits of the subsystem from a local fault collection and control (FCCS) of the subsystem when a software recovery of the fault fails. Based on the received fault indication, the local FCCS and a central FCCS of a central system is masked from additional fault indications from the one or more circuits. The central system then signals the reset of the one or more circuits of the subsystem after the masking of the additional fault indications, wherein the one or more circuits is reset based on the signaling and the additional faults are masked from one or more of the local FCCS and central FCCS during the reset.

20 Claims, 5 Drawing Sheets

(56) References Cited

U.S. PATENT DOCUMENTS

| | | | |
|---|---|---|---|
| 10,902,166 B2* | 1/2021 | de Lescure | G06F 30/392 |
| 11,334,409 B2* | 5/2022 | Nautiyal | G06F 11/0775 |
| 2002/0144177 A1* | 10/2002 | Kondo | G06F 11/1441 |
| | | | 714/13 |
| 2003/0126142 A1* | 7/2003 | Tu | G06F 11/1645 |
| | | | 714/E11.061 |
| 2004/0123201 A1* | 6/2004 | Nguyen | G06F 11/1654 |
| | | | 714/E11.061 |
| 2006/0168385 A1* | 7/2006 | Brunheim | G06F 9/4812 |
| | | | 710/260 |
| 2006/0276988 A1* | 12/2006 | Sultenfuss | G01R 31/31727 |
| | | | 702/106 |
| 2009/0271536 A1* | 10/2009 | Tiennot | G06F 13/28 |
| | | | 710/28 |
| 2019/0163655 A1* | 5/2019 | Yamaguchi | G06F 11/0757 |
| 2019/0171536 A1* | 6/2019 | Refaeli | G06F 11/203 |
| 2019/0205489 A1* | 7/2019 | de Lescure | G06F 12/0815 |
| 2019/0245620 A1* | 8/2019 | Rafique | H04B 10/27 |
| 2019/0303278 A1* | 10/2019 | Dickie | G01R 31/318519 |
| 2020/0382852 A1* | 12/2020 | Rahman | H04L 41/40 |
| 2022/0121512 A1 | 4/2022 | Srivastava et al. | |
| 2023/0314506 A1* | 10/2023 | Colombo | G01R 31/318566 |
| | | | 324/762.01 |

* cited by examiner

METHOD AND APPARATUS FOR FAULT INDICATION PROPAGATION AND FAULT MASKING IN A HIERARCHICAL ARRANGEMENT OF SYSTEMS

CROSS-REFERENCE TO RELATED APPLICATIONS

This application claims the priority under 35 U.S.C. § 119 of India patent application No. 202341015474, filed on 8 Mar. 2023, the contents of which are incorporated by reference herein.

BACKGROUND

Field of the Disclosure

This disclosure generally relates to fault handing, and more particularly to fault indication propagation and fault masking in a hierarchical arrangement of systems.

Description of the Related Art

BACKGROUND

Increasing level of system integration has resulted in increased numbers of processing systems being integrated in subsystems of a system on a chip (SoC). The processing systems facilitate execution of software applications and result in a possibility of hardware faults being generated in the processing systems. To maintain reliable operation of the SoC, the faults need to be detected and recovered from without affecting operation of remaining subsystems and comprising functional safety of the SoC.

DETAILED DESCRIPTION OF EMBODIMENTS

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to fault indication propagation and fault masking in a hierarchical arrangement of systems in a system on a chip (SoC). A central fault collection and control system (FCCS) of a central system is in communication with a respective local FCCS of a plurality of subsystems. The local FCCS of a subsystem collects a fault indication from a processing system which could include one or more of a processing core, hardware resource, or other electronic circuit in the respective subsystem and reports the fault indication across a subsystem boundary to the central FCCS of the central system by an asynchronous communication. The central FCCS performs a software reset of a software reset domain (SRD) of the subsystem which in an example includes the processing system and/or local FCCS which generated the fault. In some cases, the software reset causes glitches in the SRD which might further produce a fault indication. The fault indication associated with the software reset is masked from one or more of the local FCCS of the subsystem and the central FCCS depending on the fault so that the software reset is completed. If the software reset which is performed fails, then the central FCCS performs a hardware reset for the non-software recoverable fault indication. A fault indication associated with the hardware reset is masked from the central FCCS so that the hardware reset is completed. Further, a duration of the masking is controlled before and after reset assertion and deassertion to avoid a race condition between a masking signal and a reset signal. Well known instructions, protocols, structures, and techniques have not been shown in detail in order not to obfuscate the description.

Example System

Figure 1:
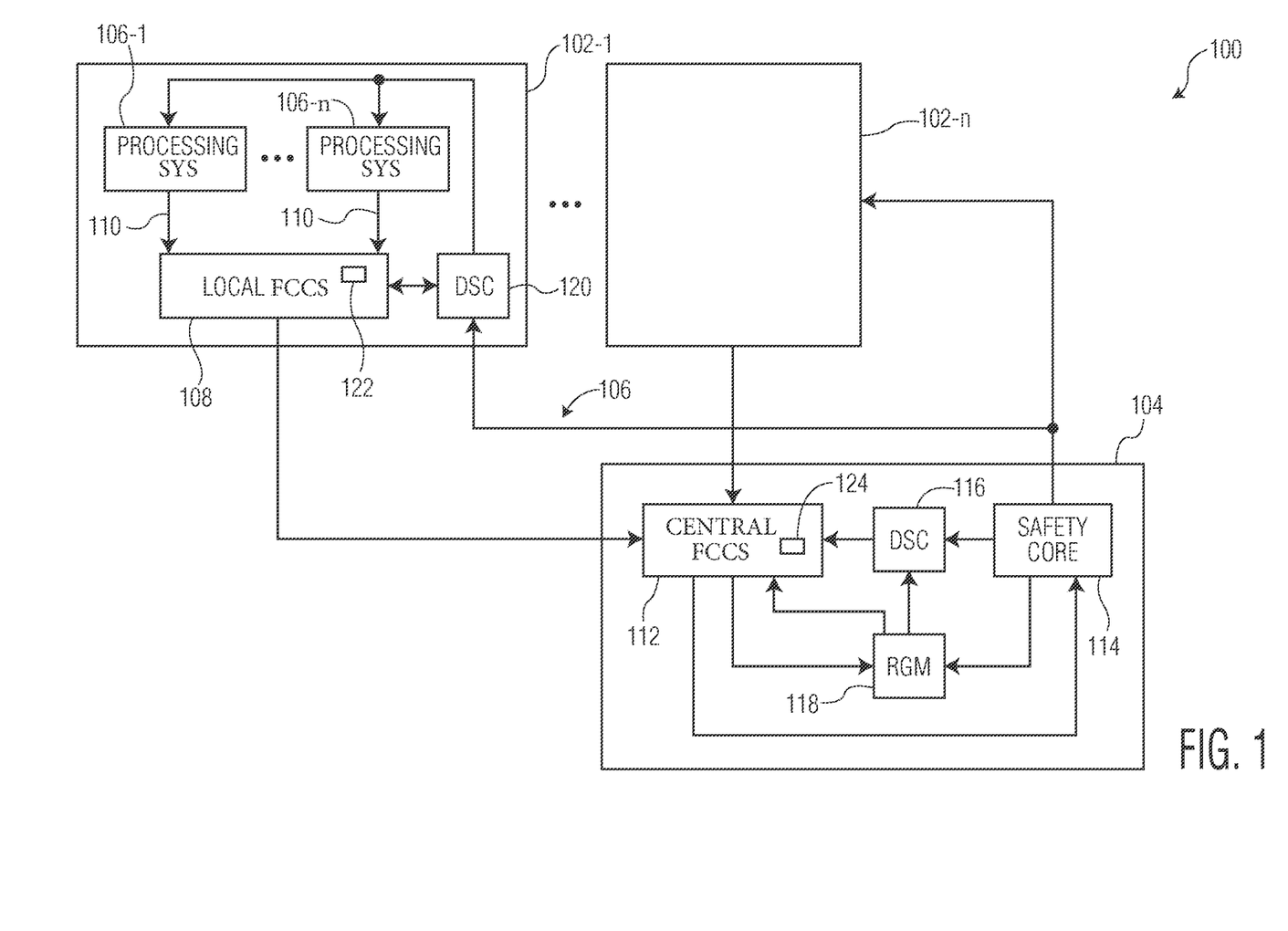
FIG. 1 is an example block diagram of a hierarchical arrangement of systems configured with fault indication propagation and fault masking in accordance with an embodiment.

FIG. 1 is an example block diagram of a hierarchical arrangement of systems 100 configured with fault indication propagation and fault masking in accordance with an embodiment. The systems may be embedded in an electronic system (not shown) such as an automotive system, an aircraft guidance system, a home security system, among other systems and implemented with circuitry such as one or more of analog circuitry, mix signal circuitry, memory circuitry, logic circuitry, and processing circuitry that executes code stored in a memory that when executed by the processing circuitry performs the disclosed functions, among other implementations, on a system on a chip (SoC). The systems include one or more subsystems 102-1 to 102-n communicatively coupled to a central system 104 by a communication bus 106 such as but not limited to a microcontroller bus, a high-performance bus, a peripheral bus, or an extensible interface bus to form a hierarchical relationship between the subsystems 102 and the central system 104. A subsystem of the one or more subsystems 102-1 to 102-n may each have one or more processing systems 106-1 to 106-n which may facilitate execution of one or more software applications in the arrangement of systems such as an anti-lock braking application, an airbag control application, an adaptive cruise control application, or the like when the system is embedded in an automotive system. The processing system 106 may include one or more of central processing units, processors, microprocessors, electronic controls, and hardware resources such as a clock monitor, watchdog circuit, direct memory access (DMA) circuit, memory, memory controller, input/output controller, accelerator, or other circuits etc.

Each subsystem 102 may be arranged with a respective local fault collection and control system (FCCS) 108 which is coupled to the one or more processing systems of the subsystem 102 by way of a respective fault channel 110. The local FCCS 108 is configured to receive from a fault channel 110 a fault indication in response to occurrence of a fault (e.g., a hardware fault) in one or more of the processing system 106. The fault may be a failure of a physical component in the hardware and the fault indication is an information message that includes information pertaining to the fault such as, but not limited to, a type of fault, a time at which that the fault had occurred, and various other parameters required to characterize the fault. In an example, the fault may be detected by a failure of a transaction such as an error correction code (ECC) check failure or communication failure between a processing core and a resource in on or more processing systems 106.

The local FCCS may attempt to perform a software fault recovery from the fault to remedy the fault. For example, the subsystem may change a functional flow in the software as part of exception handling to prevent the fault from happening again. If the software fault recovery fails, in an example, the fault indication is escalated and a reset of a processing system 106-1 and/or local FCCS 108 may be performed based on the fault indication. The reset may be one or more of a software reset and hardware reset. The software reset may include terminating an application (e.g., software or execution environment) executing on one or more of the processing systems 106 and the local FCCS 108 which triggered the fault and restarting the application. The hardware reset may clear one or more of configuration data and the application from a storage associated with a processing system 106 which is then reloaded in a boot of one or more of the processing system 106 and the local FCCS 108.

In some examples, a reset may produce glitches which result additional faults indications being generated during the reset. The additional fault indications may prevent the reset from being completed. To avoid this problem, the central system 104 may perform a reset sequence to mask the additional fault indications generated during the reset. Masking is a process of preventing the fault indication from causing a recipient which in this case is the local or central FCCS to generate a fault reaction so that the reset is able to be completed without interruption by additional fault indications and additional fault reactions.

In an example, the fault indication may include a domain identifier (DID) which indicates an application which was being executed when the fault occurred. For example, a first application is associated with a domain identifier 1 (DID_1) and a second application is associated with a domain identifier 2 (DID_2). The DID may define a software reset domain (SRD) which identifies one or more processing systems in one or more subsystems which facilitates execution of the application associated with the DID and is to be software reset. The one or more processing systems identified may include the processing system which generated the fault and optionally one or more additional processing systems that might also need to be software reset based on the fault. The local FCCS 108 may send the fault indication received from the processing system 106-1 which generated the fault to the central system 104.

The central system 104 may have a safety core 114 and distributed system controller (DSC) 116 to facilitate the reset sequence. Based on the DID received from the local FCCS 106, the central FCCS 112 may signal the safety core 114 to mask the local FCCS 108 from receiving fault indications associated with a software reset of the processing system 106 in which the fault indication was generated and any other processing system, where both the processing system in which the fault indication was generated and the other processing system is in the SRD. The safety core 114 may then signal a distributed system controller (DSC) 120 of the subsystem 102-1 to mask fault indications associated with the software reset. The central FCCS 112 may further store a policy for reacting to a fault associated with the DID received from the local FCCS 106 and the central FCCS 112 may cause the safety core 114 to indicate to the subsystem 102-1 to mask from the local FCCS 108 a specific fault indication indicated by the policy. In an example, the safety core 114 may indicate to the DSC 120 of the subsystem 102-1 to mask from the local FCCS 108 the specific fault indication on the fault channel 110 resulting from the one or more processing systems 106 in the SRD being software reset based on the policy. In response to the indication from the safety core 114, the DSC 120 may set one or more bits of a register 122 in the local FCCS 108 which indicates whether a fault indication from the one or more processing systems indicated by the safety core 114 is to be masked. In an example, the bit may have one value when a fault indication is masked and another value when a fault indication is not masked. The masking avoids the fault indication from disrupting the software reset. Then, the safety core 114 may signal the DSC 120 of the subsystem 102-1 to software reset the processing system 106 in which the fault indication was generated in the SRD and any other processing system of the SRD. In one example, the local FCCS 108 may send an interrupt to another circuit coupled to the processing system 106-1 (e.g., DSC 120) in the subsystem 102-1 which then signals the processing system 106-1 to perform the software reset. In another example which is not shown, the local FCCS 108 may send an interrupt to the processing system 106-1 to perform the software reset in the processing system 106-1.

In some examples, a local FCCS 108 may have a fault instead of or in addition to a processing system 106-1 of the subsystem 102. For example, the local FCCS 108 may have a pipeline circuit which has a fault and require software reset of the local FCCS 108. The local FCCS 108 may send a fault indication such as DID to the central FCCS 112. The DID may indicate an SRD which includes the local FCCS 108 to be software reset. To reduce occurrence of a glitch when the local FCCS 108 of the SRD is reset, the central FCCS 112 may provide a signal to the DSC 116 which masks from the central FCCS 112 a specific fault indication from the local FCCS 106 to be reset. In an example, one or more bits may be set in the register 124 to mask the specific fault indication from the local FCCS 108 when the local FCCS 108 is reset. The fault indication that is masked from the central FCCS 112 may be based on a policy associated with the DID. If the fault indication from the local FCCS 106 is masked, then the central FCCS 102 may not perform any further fault reaction to the fault indication generated by local FCCS 108. If the fault indication from the local FCCS 108 is not masked, then the fault indication generated by local FCCS 106 may be received by the central FCCS 112 and the central FCCS 102 may perform a fault reaction in response to the fault indication. The safety core 114 may then cause the DSC 120 to software reset the local FCCS 108, avoiding glitches during the software reset while other local FCCS or subsystems are not reset and remain operational. In an example, the software reset of the local FCCS 108 causes the subsystem 102-1 having the local FCCS 108 and processing systems 106 to be software reset, referred to as a subsystem software reset.

In examples, the central system 104 may also have a reset generation module (RGM) 118. The RGM 118 may perform a hardware reset of the system 100 such as hardware reset of the plurality of subsystems 102. The hardware reset may be performed if the fault still occurs after the software reset. Alternatively, the hardware reset may be performed if the software reset cannot be performed, e.g., a fault in a critical clock path which prevents performing the software reset. In one example, the central FCCS 112 may determine based on a policy associated with the DID received from the local FCCS 102 whether to perform the software reset or hardware reset. If the hardware reset is to be performed, then based on the policy the central FCCS 112 may signal the RGM 118 to signal the DSC 116 to mask from the central FCCS 112 a specific fault indication from one or more of the subsystems 102 or directly cause the specific fault indication from the subsystems 102 to be directly masked in the central FCCS 112. In another example, the central FCCS 112 may signal based on the policy the safety core 114 to signal the RGM 118 to mask from the central FCCS 112 the fault indication from one or more of the subsystems 102. In yet another example, the RGM 118 may mask from the central FCCS 112 the fault indications via the DSC 116. In an example, one or more bits may be set in the register 124 to mask the fault indication from the one or more subsystems 102. The safety core 114 may then signal the hardware reset which resets one or more of the processing systems 106 and corresponding local FCCS of the one or more subsystems 102, referred to as a subsystem hardware reset while other subsystems might not be reset and remain operational. The masking avoids the fault indication from disrupting the hardware reset.

In an example, the local FCCS 108 may virtualize fault handling for an application running on a processing system 106 of a subsystem 102 and may be referred to as a local virtual FCCS (local VFCCS). The local VFCCS may isolate fault handling for the application running on the processing system. Similarly, the central FCCS 112 may virtualize fault handling for an application running on the subsystem 102 and may be referred to as a central VFCCS. The central VFCCS may isolate fault handling for the application running on the subsystem.

Figure 2:
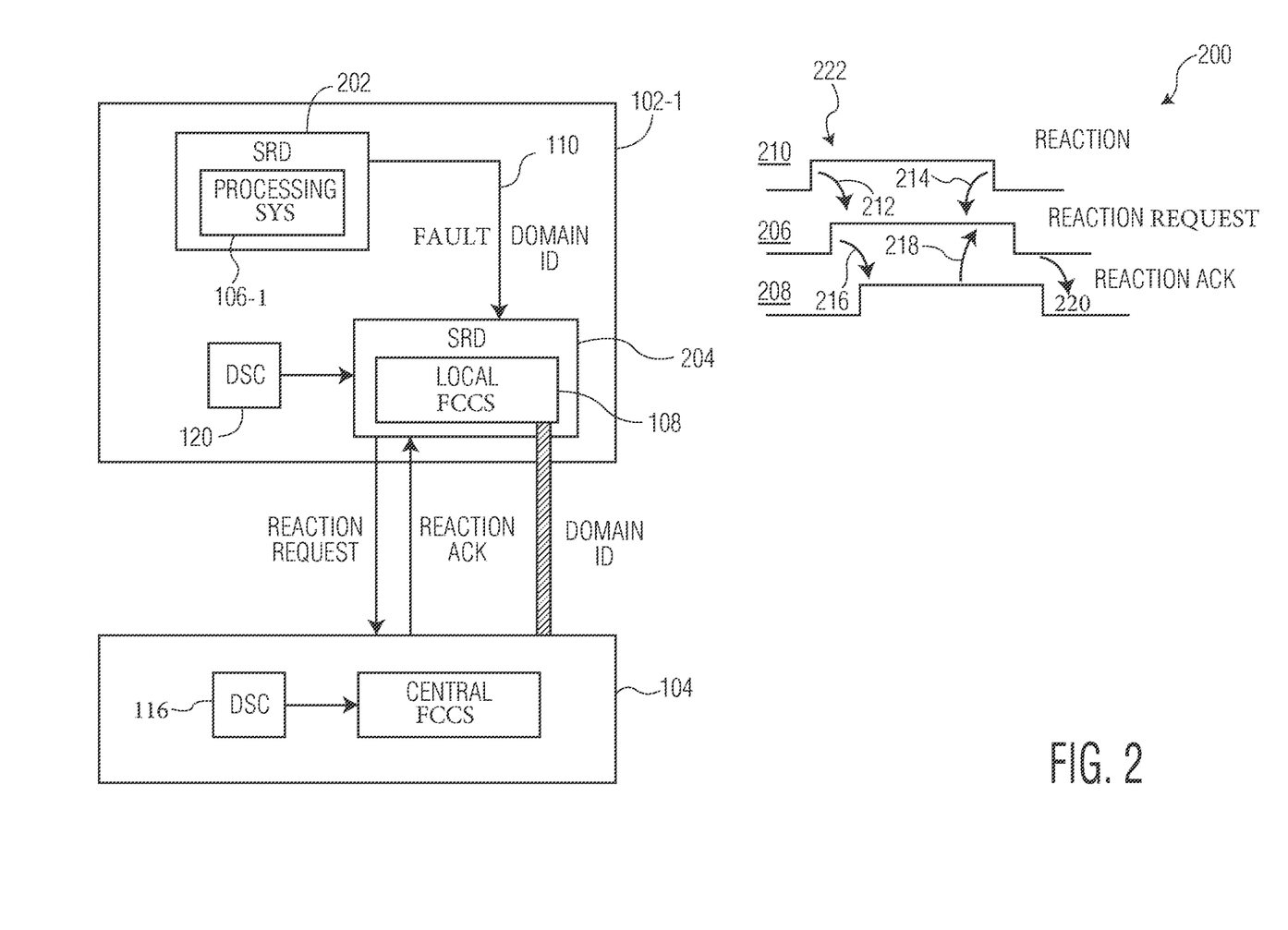
FIG. 2 is an example simplified block diagram which illustrates a communication protocol between systems in accordance with an embodiment.

FIG. 2 is an example simplified block diagram 200 which illustrates a communication protocol between systems in accordance with an embodiment. In an example, the processing system 106-1 of the subsystem 102-1 may detect a fault and provide a fault reaction notification 210 to the local FCCS 108 in a fault channel 110. Further, the processing system 106-1 may provide to the fault channel 110 a fault indication in the form of the DID. The local FCCS 108 may indicate to the central FCCS 112 in the central system 104 a fault indication in the form of the DID associated with the fault when the fault still occurs after the fault recovery fails. The DID is communicated from the local FCCS 108 to the central FCCS 122 via a handshake. The handshake 222 is needed because the local FCCS 108 and the central FCCS 112 may be in different clock domains and synchronized to different clocks.

The handshake 222 may confirm that the DID is successfully transmitted and received. The handshake 222 may be triggered by the fault reaction notification 210 in the local FCCS 108 being asserted resulting from receipt of a fault indication from the processing system 106-1. The handshake 222 may comprise a reaction request 206 and acknowledgement 208 to the reaction request 206 to indicate that the DID is communicated from the local FCCS 108 to the central FCCS 112. The handshake 222 facilitates the transfer of the DID across subsystems 102, 104 operating in different clock domains. Assertion of the reaction signal 204 may cause at 212 the local FCCS 108 to assert the reaction request 206 which is provided to the central FCCS 112. Receipt of reaction request 206 by the central FCCS 112 causes at 216 the central FCCS 112 to assert an acknowledgement 208 to the request which is provided to the local FCCS 108. At some later time, the reaction signal 210 may be deasserted. The assertion of the acknowledgment 206 at 218 and subsequent deassertion of the reaction signal 210 in the subsystem 102 at 214 causes the local FCCS 108 to deassert the reaction request 206 to the central FCCS 112 which in turn causes the central FCCS 112 to deassert the acknowledgement 208 to the local FCCS 108 at 220. The deassertion of the reaction 210, reaction request 206, and acknowledgement 208 indicates that the DID has been transferred across the subsystems associated with different clock domains. In an example, the local FCCS 108 may have a state machine which transitions from one state to indicate that a DID is to be transferred and to another state when the DID is transferred.

In some examples, the subsystem 102 and the central system 104 may be in a same clock domain. The transfer of the DID may not require the handshake as disclosed. Instead, the DID may be transmitted from the subsystem 102 to the central system 104 without the disclosed handshake.

In an example, the processing system 106-1 to be software reset may be associated with a software reset domain (SRD) 202. The SRD 202 may include one or more processing systems which generated the fault and/or one or more other processing systems which might produce a glitch based on a software reset of the processing system which generated the fault. A policy stored in the central FCCS 112 may map the DID of the fault to the SRD whose faults are to be masked. The safety core 114 may signal the DSC 120 of the subsystem 102-1 to mask a fault indication which may be generated from the SRD 202 which includes the processing system 106-1 which generated the fault so that fault indications from the SRD 202 may be masked to the local FCCS 108. In an example, the DSC 120 of the local FCCS 108 may set one or more bits in a register 122 of the local FCCS 108 which indicates whether or not to mask a fault indication from an SRD 202 while other fault indications from another SRD may not be masked. In an example, the fault indication from the SRD 202 may be a fault indication from a processing system in the SRD 202 being software reset. The fault indication from the SRD 202 may be masked because a reset of the processing system 106-1 may cause glitches to be generated by the processing system 106-1 in the SRD 202 or other processing systems in the SRD 202 as a result of the software reset of the processing system 106-1 and the glitches could generate fault indication that would affect the software reset. In one example, the safety core 116 may then signal the DSC 120 of the subsystem 102 to software reset the processing system 106-1 associated with the fault indication. The reset could include one or more of signaling an IRQ pin, NMI pin, or reset pin of circuit in a processing system 106 to cause the software reset.

In an example, the local FCCS 108 to be software reset may be associated with a software reset domain (SRD) 204. A policy stored in the central FCCS 112 may map the DID of the fault to the SRD whose faults are to be masked. When a central FCCS 112 receives a fault indication from the local FCCS 108, the safety core 114 may signal the DSC 116 of the central system 104 to mask the fault indication which may be generated in the SRD 204 which includes the local FCCS 108 and provided to the central FCCS 112. In an example, the DSC 116 may set one or more bits in a register 124 of the central FCCS 112 which indicates whether or not to mask a fault indication from the SRD 204. In an example, the fault indication from the SRD 204 may be a fault indication from the local FCCS in the SRD 204 being reset. The fault indication from the SRD 204 may be masked because a software reset of the local FCCS 118 may cause glitches to be generated in the SRD 204 and the glitches would otherwise generate fault indications to the central FCCS 112 that would affect the software reset of the local FCCS 108. The safety core 116 may then signal the DSC 120 of the subsystem 102 to software reset the local FCCS 108 associated with the fault indication. In some examples, the SRD 204 may include additional processing systems (not shown). In an example, the software reset of the local FCCS 108 may be referred to as a subsystem software reset.

Figure 3:
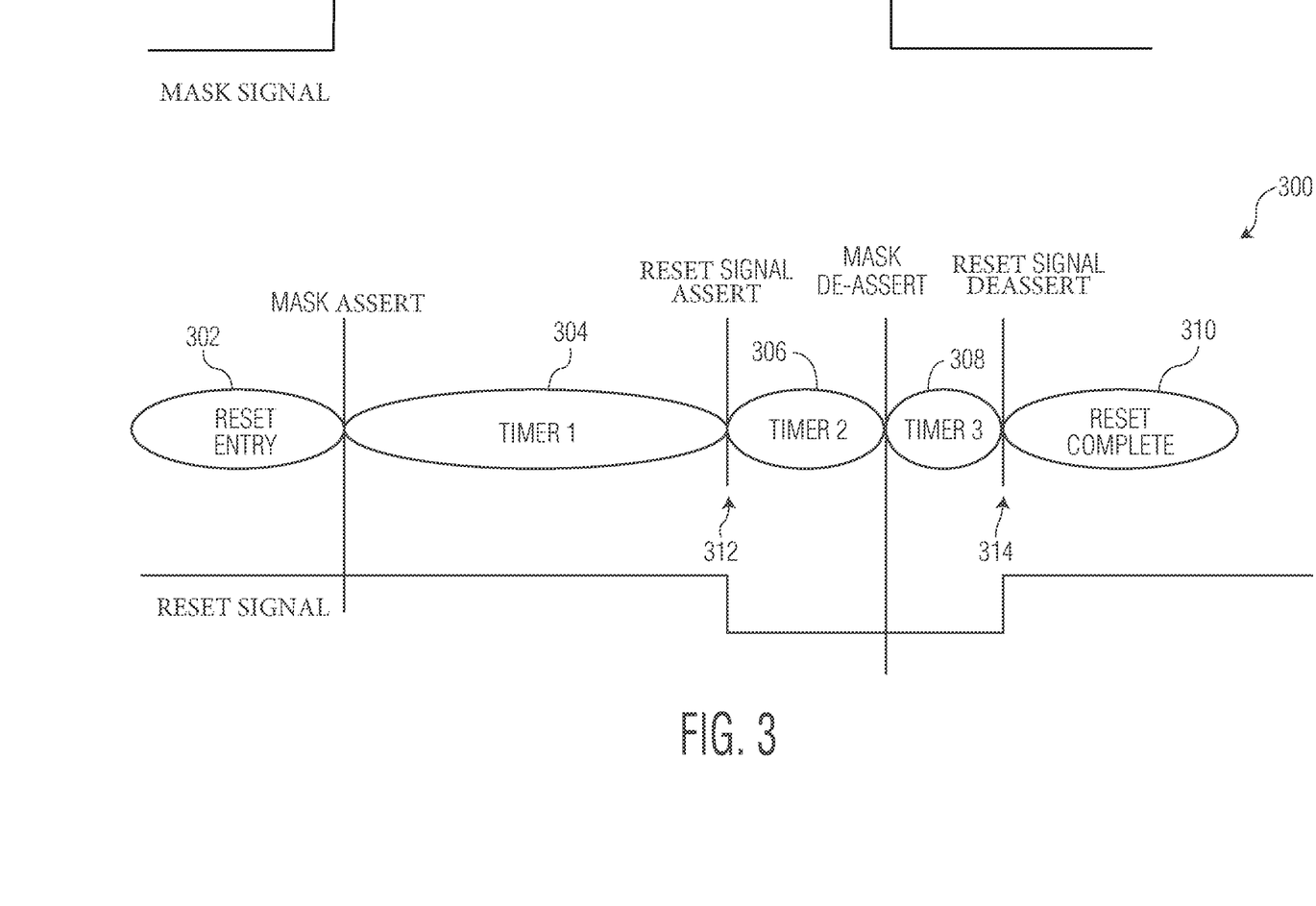
FIG. 3 illustrates a timing diagram associated with masking of fault indications generated by a hardware reset in accordance with an embodiment.

FIG. 3 illustrates a timing diagram 300 associated with masking of fault indications generated by a reset in accordance with an embodiment. The functions may be performed by the safety core 114 or DSC 116 in an example. The reset may be a hardware reset or software reset in an example. At 302, a reset sequence associated with a reset of processing system 106-1 and/or local FCCS 108 is initiated. A mask enable signal (active high) is generated which causes one or more faults indications to be masked. The mask may prevent the local FCCS 108 from reacting to a fault indication from a processing system 106-1 or the central FCCS 112 reacting to a fault indication from a local FCCS 108 or processing system 106-1. The masking may be established for a period of time indicated by timer_1 304 before a reset signal to the processing system 106-1 or local FCCS 108 is initiated. At 312, a reset signal is asserted by an active low in this example. A timer_2 306 may indicate a time that the reset signal is asserted after which the mask enable signal is deasserted. The masking signal may be deasserted before the reset signal is later deasserted in an example which causes the fault indications associated with reset to be no longer masked. The reset signal may continue to be asserted until a time indicated by a timer_3 308 after the masking signal is deasserted. At 314, after the timer_3 is expired, the reset signal may be deasserted by an active high signal and the processing system 106-1 or local FCCS 108 is reset. In an example, a duration of the timer_1 304, timer_2 306, and timer_3 308 may be selected to avoid possible race conditions between assertion of the reset signal and mask signal because the DSC 116 associated with the central system 104 is in a different clock domain from the DSC 120 associated with the subsystem 102-1.

Figure 4A:
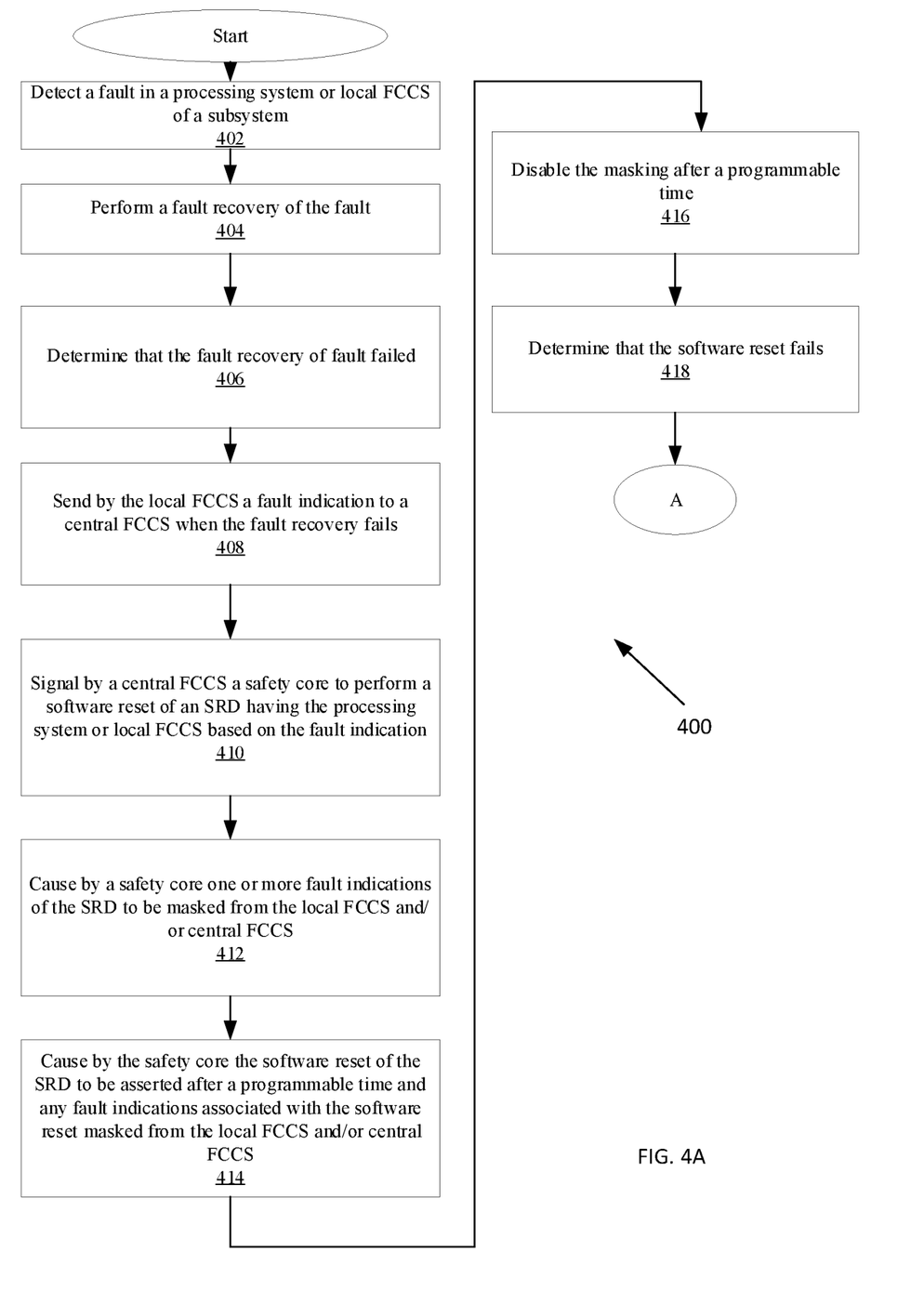
FIGS. 4A & 4B illustrate a flow chart of functions associated with fault indication propagation and fault masking in accordance with an embodiment; and The drawings are for the purpose of illustrating example embodiments, but it is understood that the embodiments are not limited to the arrangements and instrumentality shown in the drawings.
Figure 4B:
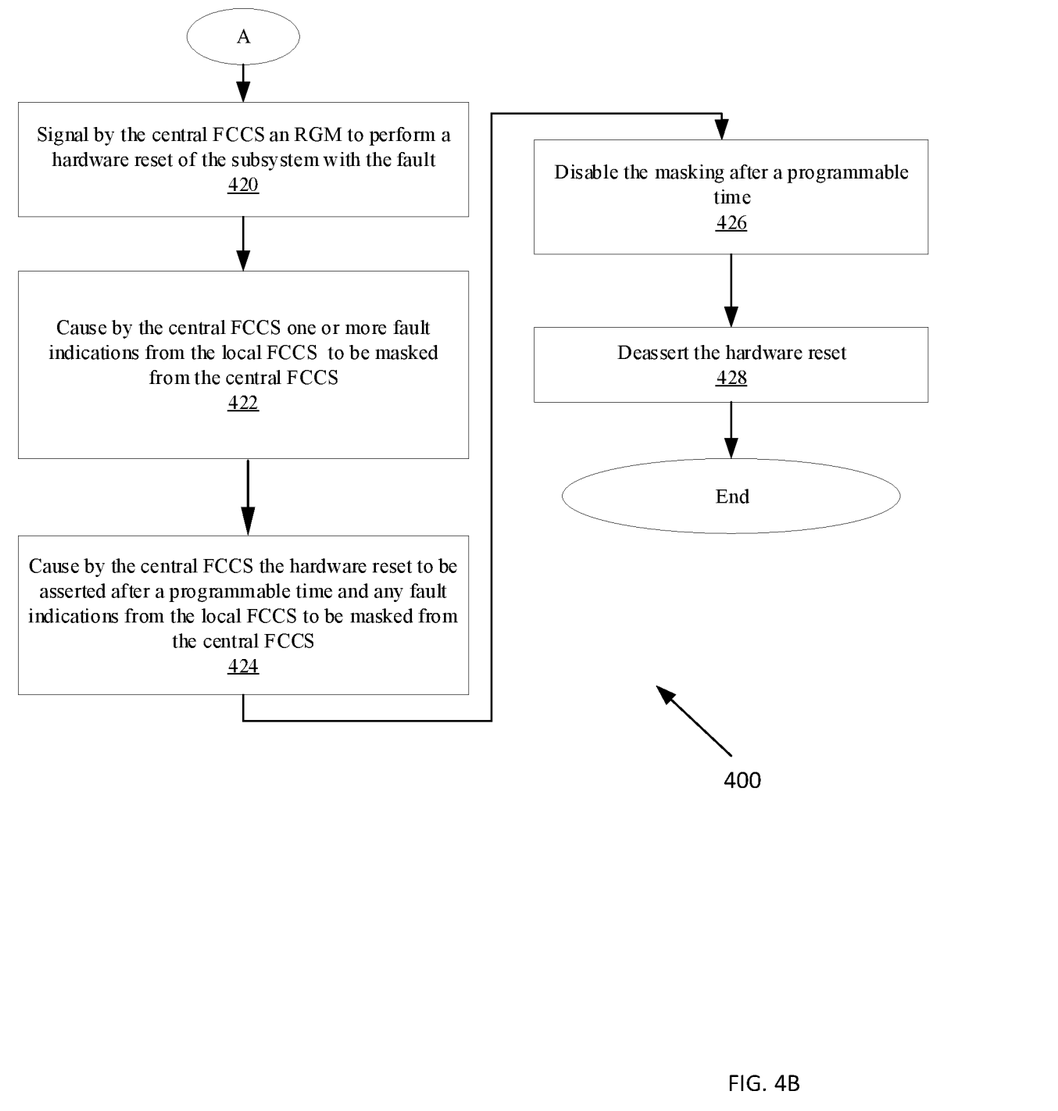

FIGS. 4A and 4B illustrate a flow chart of functions 400 associated with hierarchical fault indication propagation and fault masking in accordance with an embodiment. The functions 400 may relate to fault indication propagation and masking resulting from a fault in a processing system or local FCCS and performed by the system 100.

At 402, a fault is detected in a processing system or local FCCS of a subsystem At 404, a fault recovery of the fault is performed by the local FCCS or processing system. The fault recovery may be functions other than a software or hardware reset of the processing system or local FCCS in an example. At 406, a determination is made that the fault recovery failed. At 408, the local FCCS sends a fault indication to a central FCCS when the fault recovery fails. The fault indication may be sent via a handshake to the central FCCS. At 410, the central FCCS signals a safety core to perform a software reset of an SRD having the processing system or local FCCS based on the fault indication. At 412, the safety core causes one or more fault indications of the SRD to be masked from the local FCCS and/or central FCCS. At 414, the safety core causes the software reset of the SRD to be asserted after a programmable time and any fault indications associated with the software reset is masked from the local FCCS. At 416, the masking is disabled after a programmable time. At 418, a determination is made that the software reset fails. At 420, the central FCCS may signal an RGM to perform a hardware reset of the subsystem with the fault. At 422, the central FCCS causes one or more fault indications associated with the local FCCS to masked from the central FCCS. At 424, the FCCS causes the hardware reset to be asserted after a programmable time and any fault indications associated with the hardware reset is masked from the central FCCS. At 426, the masking is disabled after a programmable time. At 428, the hardware reset is deasserted. The reset sequence is completed.

In an example, a method for fault handling is disclosed. The method comprises: receiving from a local fault collection and control system (FCCS) of a subsystem a fault indication associated with a fault in one or more circuits of the subsystem when a software recovery of the fault fails; based on the received fault indication, masking from one or more of the local FCCS and a central FCCS of a central system coupled to the subsystem additional fault indications from the one or more circuits; and signaling the reset of the one or more circuits of the subsystem after the masking of the additional fault indications, wherein the one or more circuits is reset based on the signaling and the additional faults are masked from one or more of the local FCCS and central FCCS during the reset. In an example, receiving the fault indication comprises: receiving a reaction request which indicates that the fault indication is detected in the subsystem; and transmitting an acknowledgement of the reaction request to the local FCCS of the subsystem. In an example, receiving the reaction request and transmitting the acknowledgement comprises the local FCCS asserting the reaction request and which causes a central FCCS to assert the acknowledgement, which causes the local FCCS to deassert the reaction request and which causes the central FCCS to deassert the acknowledgement. In an example, the local FCCS which transmits the reaction request and the central subsystem which transmits the acknowledgment are associated with different clock domains. In an example, the fault indication is a domain identification which indicates application software which operates on the subsystem which generated the fault. In an example, the domain identification is mapped to a fault reaction policy which indicates the additional fault indication from a software reset domain to be masked and whether the additional fault indications are to be masked from the one or more of the local FCCS and central FCCS during the reset, the additional fault indications including the fault indication and the software reset domain indicating the one or more circuits that is affected by the reset. In an example, the fault indication is indicative of a hardware fault in the one or more circuits. In an example, the fault indication is masked for a first period of time before signaling the reset, a second period of time after signaling the reset, and not masking the fault indication after the second period of time when the reset has started but before the reset signal is deasserted. In an example, the reset is one of a hardware reset and software reset of the one or more circuits. In an example, signaling the reset further comprises causing the local FCCS to be reset. In an example, signaling the reset further comprises causing the subsystem to be reset while other subsystems coupled to the central system are not reset.

In another embodiment, a central system for fault handing is disclosed. The system comprises: a central fault collection and control system (FCCS); a safety core; wherein the central FCCS is coupled to the safety core and a subsystem;

the central FCCS arranged to receive from a local fault collection and control system (FCCS) of the subsystem a fault indication associated with a fault in one or more circuits of the subsystem when a software recovery of the fault fails; and the safety core arranged to, based on the received fault indication, mask from one or more of the local FCCS and a central FCCS of a central system additional fault indications from the one or more circuits; and signal the reset of the one or more circuits of the subsystem after the masking of the additional fault indications, wherein the one or more circuits is reset based on the signaling and the additional faults are masked from one or more of the local FCCS and central FCCS during the reset. In an example, the central FCCS arranged to receive the fault indication comprises the central FCCS arranged to: receive a reaction request which indicates that the fault indication is detected in the subsystem; and transmit an acknowledgement of the reaction request to the local FCCS of the subsystem. In an example, the central FCCS arranged to receive the reaction request and transmit the acknowledgement comprises the local FCCS arranged to assert the reaction request and which causes a central FCCS to assert the acknowledgement, which causes the local FCCS to deassert the reaction request and which causes the central FCCS to deassert the acknowledgement. In an example, the fault indication is a domain identification which indicates application software which operates in the subsystem which generated the fault. In an example, the domain identification is mapped to a fault reaction policy which indicates the additional fault indications from a software reset domain to be masked and whether the additional fault indications are to be masked from the one or more of the local FCCS and central FCCS during the reset, the additional fault indications including the fault indication and the software reset domain indicating the one or more circuits that is affected by the reset. In an example, the fault indication is indicative of a hardware fault in the one or more circuits. In an example, the fault indication is masked for a first period of time before signaling the reset, a second period of time after signaling the reset, and not masking the fault indication after the second period of time when the reset has started but before the reset signal is deasserted. In an example, the reset is one of a hardware reset and software reset of the one or more circuits. In an example, the safety core arranged to signal the reset further comprises the safety core arranged to cause the local FCCS to be reset while other subsystems coupled to the central system are not reset.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for fault handling comprising:
   receiving from a local fault collection and control system (FCCS) of a subsystem a fault indication associated with a fault in one or more circuits of the subsystem when a software recovery of the fault fails;
   based on the received fault indication, masking from one or more of the local FCCS and a central FCCS of a central system coupled to the subsystem additional fault indications from the one or more circuits; and
   signaling a reset of the one or more circuits of the subsystem after the masking of the additional fault indications, wherein the one or more circuits is reset based on the signaling and the additional fault indications which are generated in response to the reset are masked from one or more of the local FCCS and central FCCS during the reset to prevent the additional fault indications from interrupting the reset, wherein the additional fault indications are masked from the local FCCS and not the central FCCS when the central FCCS signals the subsystem to perform a software reset of the one or more circuits which does not include the local FCCS and masked from the central FCCS when the central system performs a hardware reset of the one or more circuits, the hardware reset being performed after the software reset fails.

2. The method of claim 1, wherein receiving the fault indication comprises:
   receiving a reaction request which indicates that the fault indication is detected in the subsystem; and
   transmitting an acknowledgement of the reaction request to the local FCCS of the subsystem.

3. The method of claim 2, wherein receiving the reaction request and transmitting the acknowledgement comprises the local FCCS asserting the reaction request and which causes a central FCCS to assert the acknowledgement, which causes the local FCCS to deassert the reaction request and which causes the central FCCS to deassert the acknowledgement.

4. The method of claim 3, wherein the local FCCS which transmits the reaction request and the central subsystem which transmits the acknowledgment are associated with different clock domains wherein the local FCCS and central subsystem are synchronized to different clocks in the different clock domains.

5. The method of claim 1, wherein the fault indication is a domain identification which indicates application software which operates on the subsystem which generated the fault.

6. The method of claim 5, wherein the domain identification is mapped to a fault reaction policy which indicates the additional fault indication from a software reset domain to be masked and whether the additional fault indications are to be masked from the one or more of the local FCCS and central FCCS during the reset, the additional fault indications including the fault indication and the software reset domain indicating the one or more circuits that is affected by the reset.

7. The method of claim 1, wherein the fault indication is indicative of a hardware fault in the one or more circuits.

8. The method of claim 1, wherein the fault indication is masked for a first period of time before signaling the reset, a second period of time after signaling the reset, and not masking the fault indication after the second period of time when the reset has started but before the reset signal is deasserted.

9. The method of claim 1, wherein the reset is one of a hardware reset and software reset of the one or more circuits.

10. The method of claim 1, wherein the hardware reset comprises causing the local FCCS to be reset.

11. The method of claim 1, wherein signaling the reset further comprises causing the subsystem to be reset while other subsystems coupled to the central system are not reset.

12. A central system for fault handing comprising:
a central fault collection and control system (FCCS);
a safety core;
wherein the central FCCS is coupled to the safety core and a subsystem;
the central FCCS arranged to receive from a local fault collection and control system (FCCS) of the subsystem a fault indication associated with a fault in one or more circuits of the subsystem when a software recovery of the fault fails; and
the safety core arranged to, based on the received fault indication, mask from one or more of the local FCCS and the central FCCS of a central system additional fault indications from the one or more circuits; and signal reset of the one or more circuits of the subsystem after the masking of the additional fault indications, wherein the one or more circuits is reset based on the signaling and the additional fault indications which are generated in response to the reset are masked from one or more of the local FCCS and central FCCS during the reset to prevent the additional fault indications from interrupting the reset, wherein the additional fault indications are masked from the local FCCS and not the central FCCS when the central FCCS signals the subsystem to perform a software reset of the one or more circuits which does not include the local FCCS and masked from the central FCCS when the central system performs a hardware reset of the one or more circuits, the hardware reset being performed after the software reset fails.

13. The central system claim 12, wherein the central FCCS arranged to receive the fault indication comprises the central FCCS arranged to: receive a reaction request which indicates that the fault indication is detected in the subsystem; and transmit an acknowledgement of the reaction request to the local FCCS of the subsystem.

14. The central system of claim 13, wherein the central FCCS arranged to receive the reaction request and transmit the acknowledgement comprises the local FCCS arranged to assert the reaction request and which causes a central FCCS to assert the acknowledgement, which causes the local FCCS to deassert the reaction request and which causes the central FCCS to deassert the acknowledgement.

15. The central system of claim 12, wherein the fault indication is a domain identification which indicates application software which operates in the subsystem which generated the fault.

16. The central system of claim 15, wherein the domain identification is mapped to a fault reaction policy which indicates the additional fault indications from a software reset domain to be masked and whether the additional fault indications are to be masked from the one or more of the local FCCS and central FCCS during the reset, the additional fault indications including the fault indication and the software reset domain indicating the one or more circuits that is affected by the reset.

17. The central system of claim 12, wherein the fault indication is indicative of a hardware fault in the one or more circuits.

18. The central system of claim 12, wherein the fault indication is masked for a first period of time before signaling the reset, a second period of time after signaling the reset, and not masking the fault indication after the second period of time when the reset has started but before the reset signal is deasserted.

19. The central system of claim 12, wherein the reset is one of a hardware reset and software reset of the one or more circuits.

20. The central system of claim 12, wherein the safety core arranged to signal the reset further comprises the safety core arranged to cause the local FCCS to be reset while other subsystems coupled to the central system are not reset.

* * * * *